(12) United States Patent
Harper et al.

(10) Patent No.: US 10,553,245 B2
(45) Date of Patent: *Feb. 4, 2020

(54) DAMPING LATERAL TAPE MOTION DISTURBANCES

(71) Applicant: International Business Machines Corporation, Armonk, NY (US)

(72) Inventors: David H. F. Harper, Vail, AZ (US); Peter Reininger, Rueschlikon (CH)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/927,984

(22) Filed: Mar. 21, 2018

(65) Prior Publication Data

US 2018/0211690 A1  Jul. 26, 2018

Related U.S. Application Data

(63) Continuation of application No. 15/403,080, filed on Jan. 10, 2017, now Pat. No. 9,984,720.

(51) Int. Cl.
*G11B 15/60* (2006.01)
*G11B 5/008* (2006.01)
*G11B 15/32* (2006.01)

(52) U.S. Cl.
CPC .......... *G11B 15/60* (2013.01); *G11B 5/00813* (2013.01); *G11B 15/32* (2013.01)

(58) Field of Classification Search
None
See application file for complete search history.

(56) References Cited

U.S. PATENT DOCUMENTS

| | | | |
|---|---|---|---|
| 3,091,794 A * | 6/1963 | Pillsbury, Jr. | G03D 15/00 360/130.21 |
| 3,643,037 A | 2/1972 | Norwood | |
| 4,479,158 A | 10/1984 | Froehlich et al. | |
| 5,065,500 A | 11/1991 | Yoneda et al. | |
| 5,574,606 A | 11/1996 | Kimura | |
| 5,703,741 A | 12/1997 | Wrobel et al. | |
| 5,751,527 A | 5/1998 | Sundaram et al. | |
| 5,847,906 A | 12/1998 | Saito et al. | |
| 5,930,089 A * | 7/1999 | Anderson | G11B 15/62 360/128 |
| 5,966,522 A | 10/1999 | Bjorksten et al. | |
| 5,982,592 A * | 11/1999 | Saito et al. | G11B 15/62 360/130.31 |
| 6,381,096 B1 | 4/2002 | Collins | |

(Continued)

OTHER PUBLICATIONS

Harper et al, U.S. Appl. No. 15/403,080, filed Jan. 10, 2017.

(Continued)

*Primary Examiner* — Craig A. Renner
(74) *Attorney, Agent, or Firm* — Zilka-Kotab, P.C.

(57) ABSTRACT

A system, according to one embodiment, includes: a module having transducers positioned along a tape bearing surface of the module; a roller guide; and a patterned bar positioned relative to the roller guide and module to engage a magnetic tape. The patterned bar has a plurality of recessed regions along a tape bearing surface thereof. Moreover, the patterned bar is not directly coupled to the module. Other systems, methods, and computer program products are described in additional embodiments.

18 Claims, 17 Drawing Sheets

(56) References Cited

U.S. PATENT DOCUMENTS

| | | | |
|---|---|---|---|
| 6,433,959 B1 | 8/2002 | Lakshmikumaran et al. | |
| 6,498,699 B1 | 12/2002 | Collins | |
| 6,744,593 B1 * | 6/2004 | Nayak et al. | G11B 15/605 360/130.21 |
| 7,006,329 B2 | 2/2006 | Johnson et al. | |
| 7,116,520 B2 | 10/2006 | Tanaka | |
| 7,163,175 B2 | 1/2007 | Bloomquist et al. | |
| 7,486,479 B2 | 2/2009 | Nakao et al. | |
| 7,506,836 B2 | 3/2009 | Bloomquist et al. | |
| 7,800,863 B1 | 9/2010 | Kartik | |
| 9,135,943 B2 | 9/2015 | Underkofler et al. | |
| 9,792,947 B1 | 10/2017 | Biskebom et al. | |
| 9,984,720 B1 | 5/2018 | Harper et al. | |
| 2003/0089819 A1 | 5/2003 | Bloomquist et al. | |
| 2004/0001284 A1 * | 1/2004 | Nayak et al. | G11B 15/605 360/130.21 |
| 2004/0178302 A1 | 9/2004 | Bloomquist et al. | |
| 2006/0032969 A1 | 2/2006 | Bloomquist et al. | |
| 2007/0075181 A1 | 4/2007 | Bloomquist et al. | |
| 2007/0131811 A1 | 6/2007 | Biskebom et al. | |

OTHER PUBLICATIONS

Non-Final Office Action from U.S. Appl. No. 15/403,080, dated Sep. 8, 2017.
Notice of Allowance from U.S. Appl. No. 15/403,080, dated Jan. 23, 2018.
Harper et al, U.S. Appl. No. 16/663,170, filed Oct. 24, 2019.

* cited by examiner

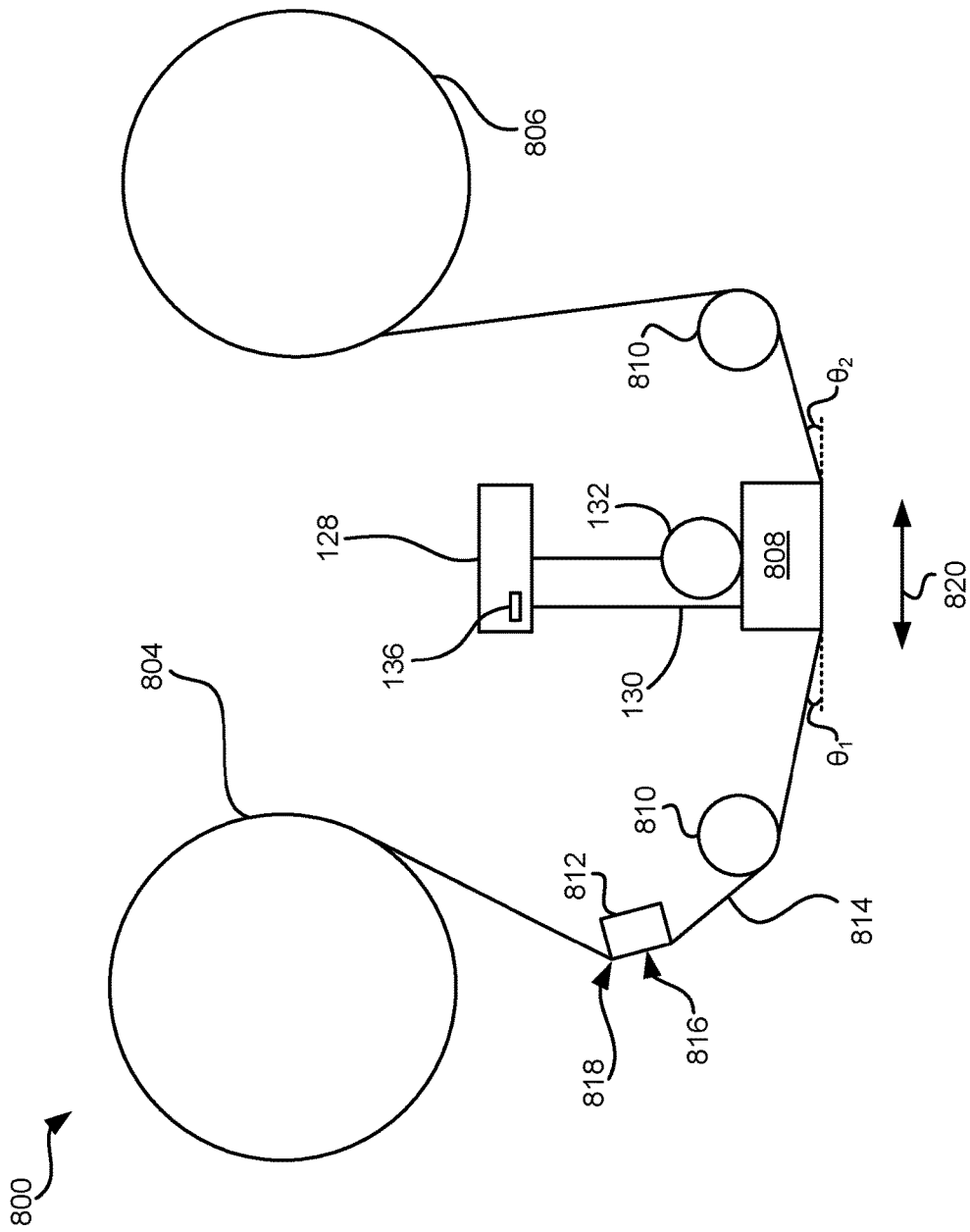

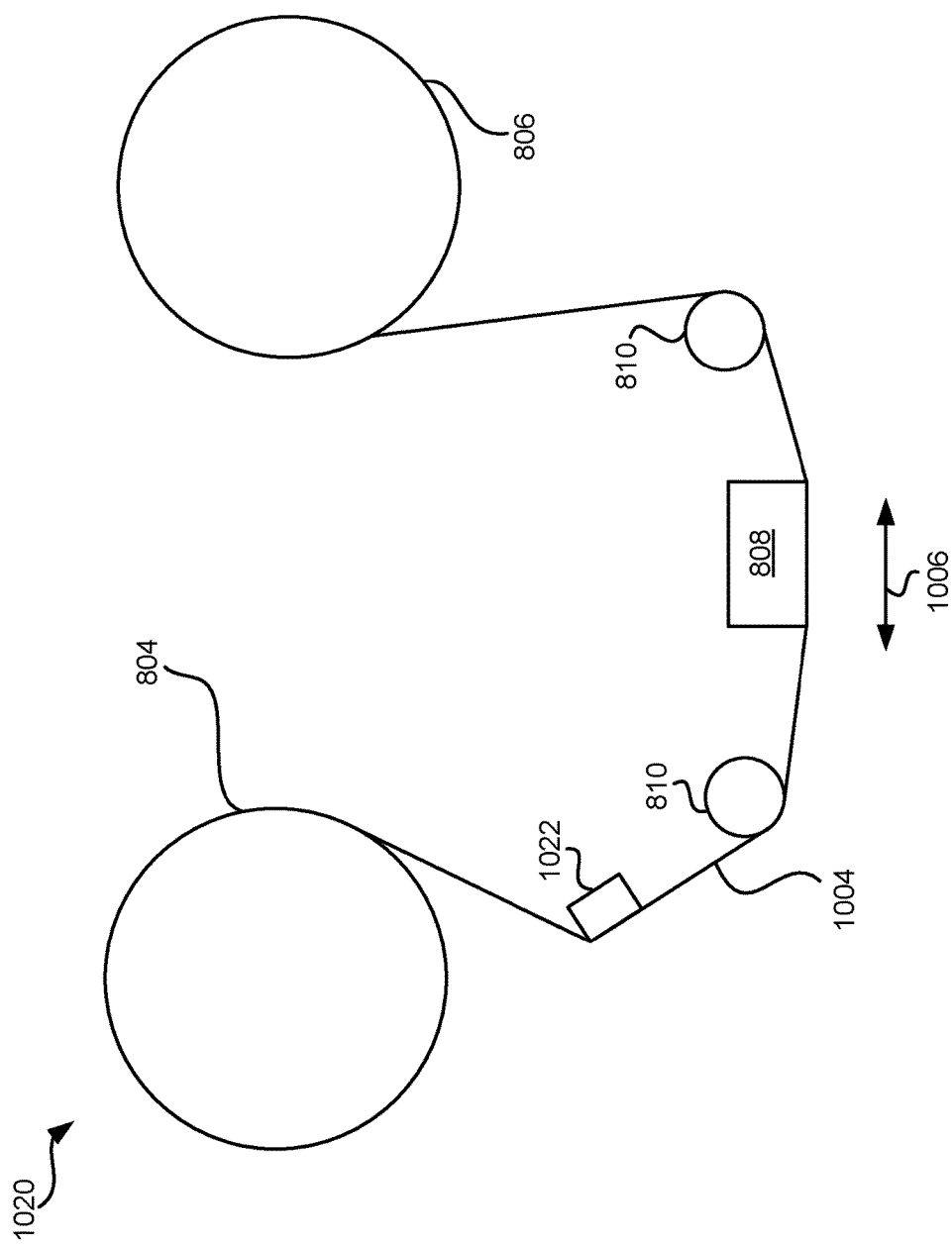

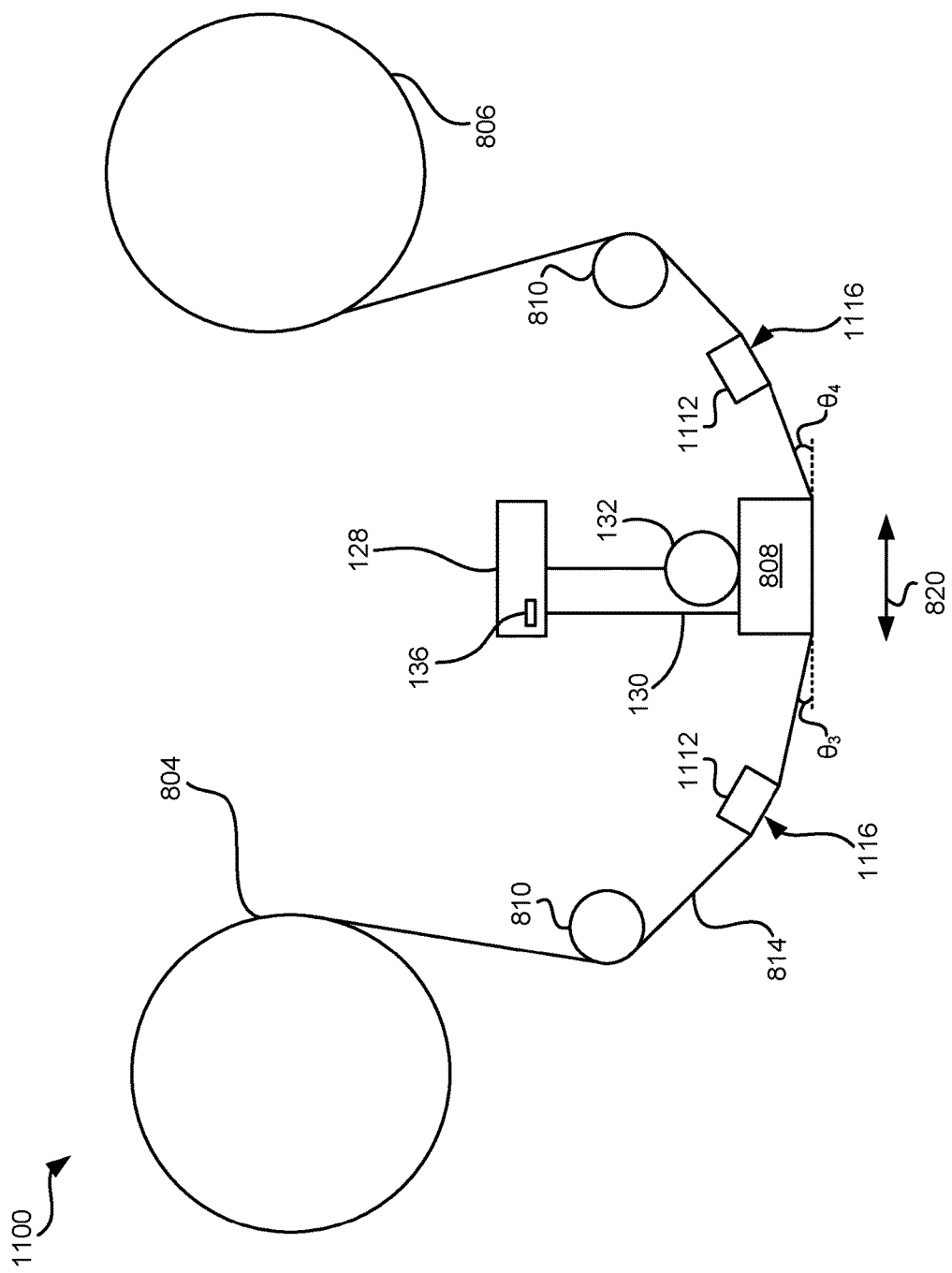

DAMPING LATERAL TAPE MOTION DISTURBANCES

BACKGROUND

The present invention relates to data storage systems, and more particularly, this invention relates to implementing one or more components to reduce lateral tape motion disturbances.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

The quantity of data stored on a magnetic tape may be expanded by increasing the number of data tracks across the tape. More tracks are made possible by reducing feature sizes of the readers and writers, such as by using thin-film fabrication techniques and magnetoresistive (MR) sensors. However, for various reasons, the feature sizes of readers and writers cannot be arbitrarily reduced, and so factors such as lateral tape motion (e.g., perpendicular to the direction of tape travel), transients and tape lateral expansion and contraction must be balanced with reader/writer sizes that provide acceptable written tracks and readback signals. One issue limiting areal density is misregistration caused by tape lateral motion. As tape is being run over the surface of a tape head, lateral shifts in the relative position between the transducers and the data tracks on the tape may occur, resulting in higher error rates and degraded performance.

SUMMARY

A system, according to one embodiment, includes: a module having transducers positioned along a tape bearing surface of the module; a roller guide; and a patterned bar positioned relative to the roller guide and module to engage a magnetic tape. The patterned bar has a plurality of recessed regions along a tape bearing surface thereof. Moreover, the patterned bar is not directly coupled to the module.

A system, according to another embodiment, includes: a module having transducers positioned along a tape bearing surface of the module; a first pair of guides positioned on a first side of the module along an intended tape travel path; a first patterned bar positioned between the first pair of guides; a second pair of guides positioned on a second side of the module opposite the first side along the intended tape travel path; and a second patterned bar positioned between the second pair of guides. The first and second patterned bars each have a plurality of recessed regions along tape bearing surface thereof.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 8 is a schematic diagram of a system according to one embodiment.

FIG. 10C is a schematic diagram of a system having a patterned bar positioned in a configuration according to one embodiment.

FIG. 11 is a schematic diagram of a system according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems having reduced lateral tape motion, as well as operation and/or component parts thereof. The lateral tape motion along a tape path may be reduced by implementing patterned bars having recessed regions formed in a tape bearing surface of the patterned bars. Moreover, these reductions to lateral tape motion may be achieved while also using smooth (e.g., non-grooved) and/or flangeless guides, as will be described in further detail below.

In one general embodiment, a system includes: a module having transducers positioned along a tape bearing surface of the module; a roller guide; and a patterned bar positioned relative to the roller guide and module to engage a magnetic tape. The patterned bar has a plurality of recessed regions along a tape bearing surface thereof. Moreover, the patterned bar is not directly coupled to the module.

In another general embodiment, a system includes: a module having transducers positioned along a tape bearing surface of the module; a first pair of guides positioned on a first side of the module along an intended tape travel path; a first patterned bar positioned between the first pair of guides; a second pair of guides positioned on a second side of the module opposite the first side along the intended tape travel path; and a second patterned bar positioned between the second pair of guides. The first and second patterned bars each have a plurality of recessed regions along tape bearing surface thereof.

Figure 1A:
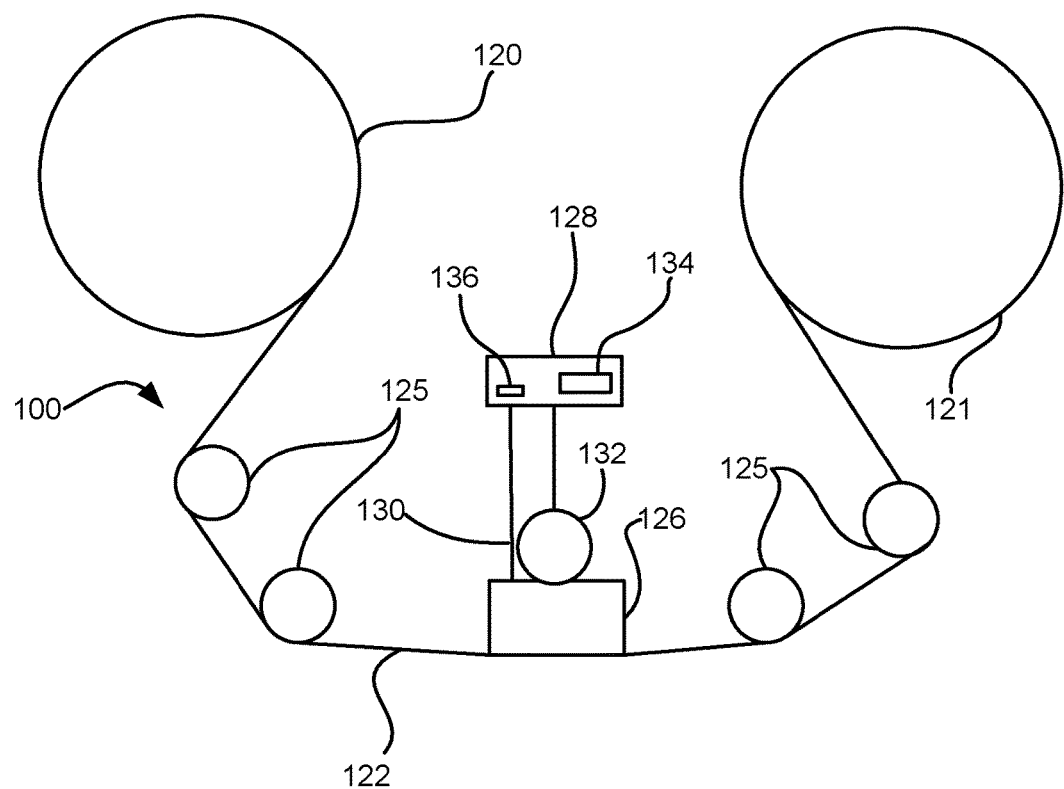
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
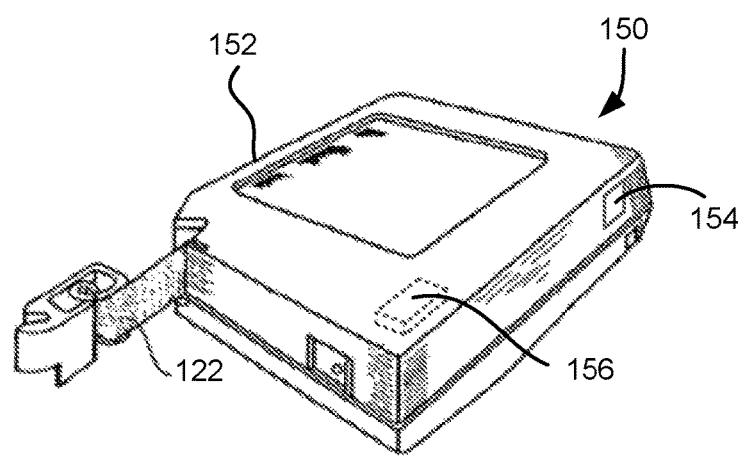
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
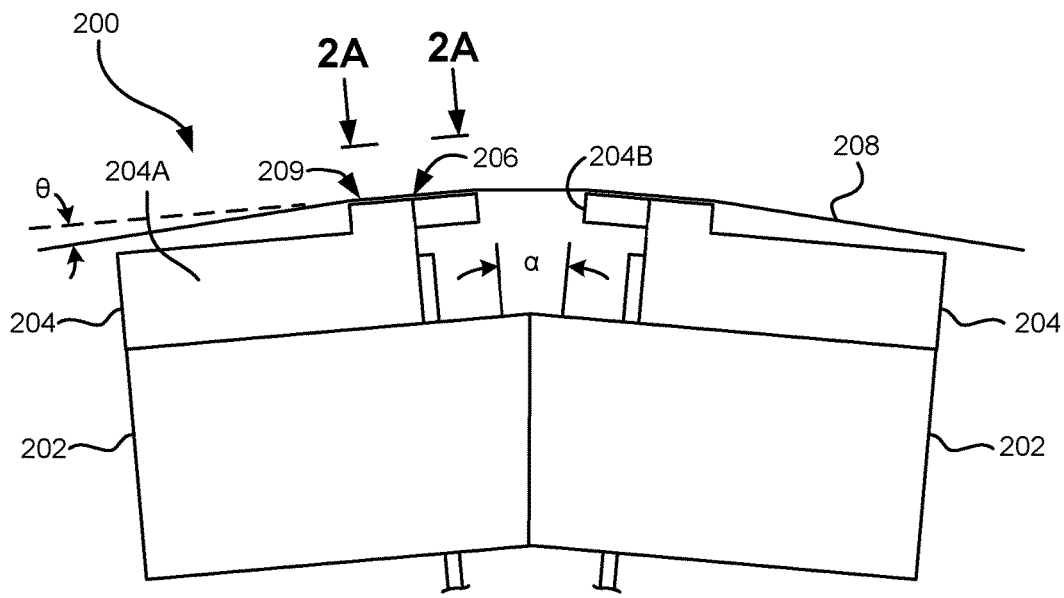
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
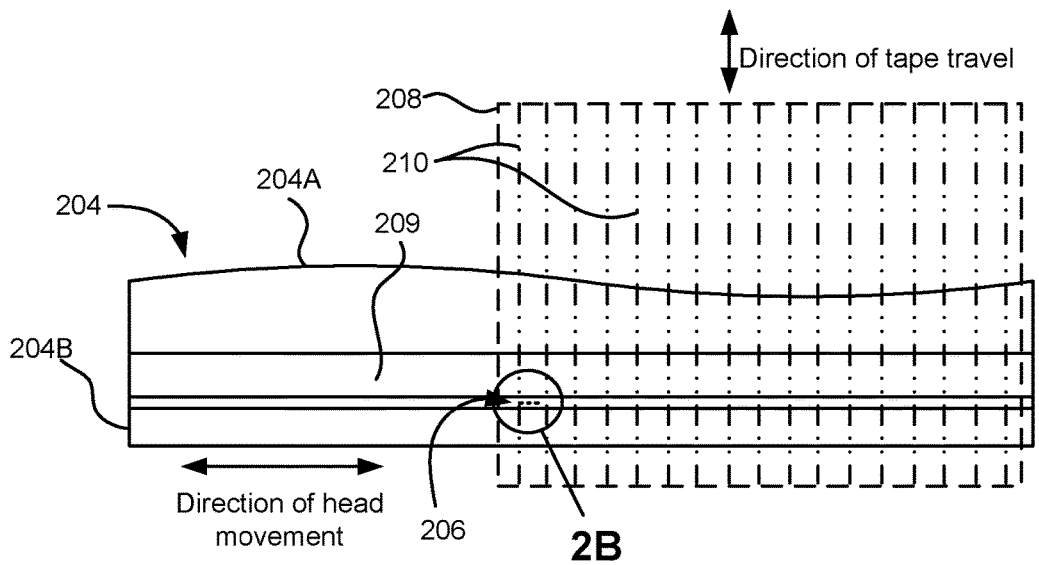
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
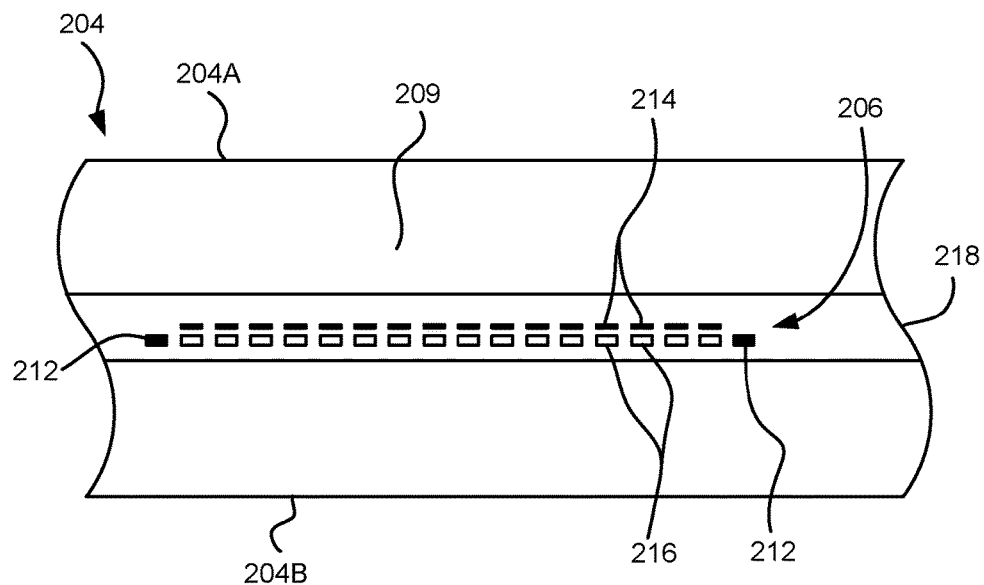
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
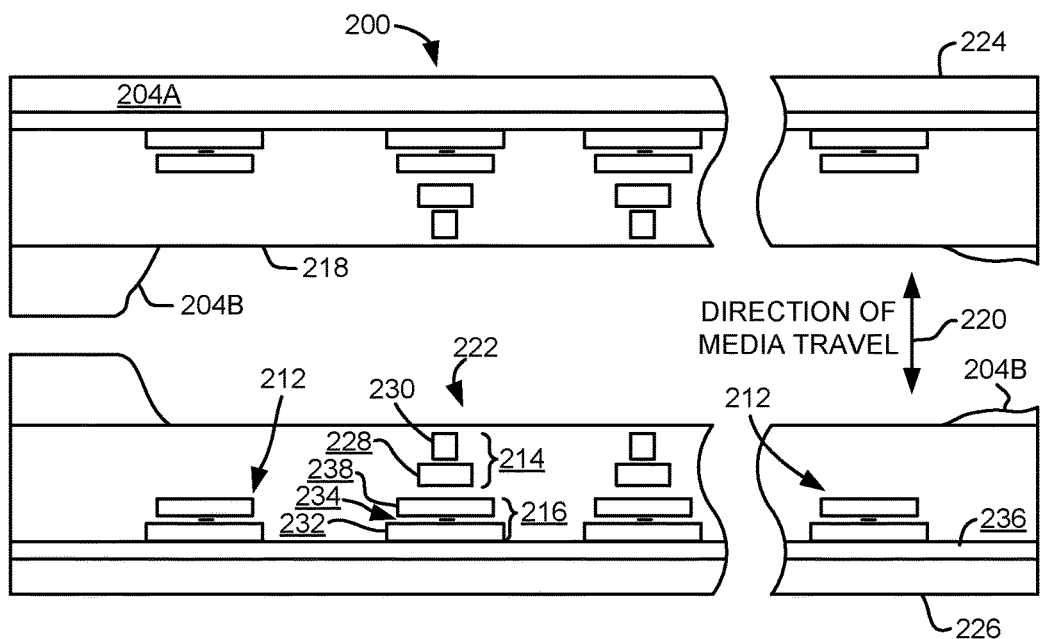
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (−), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
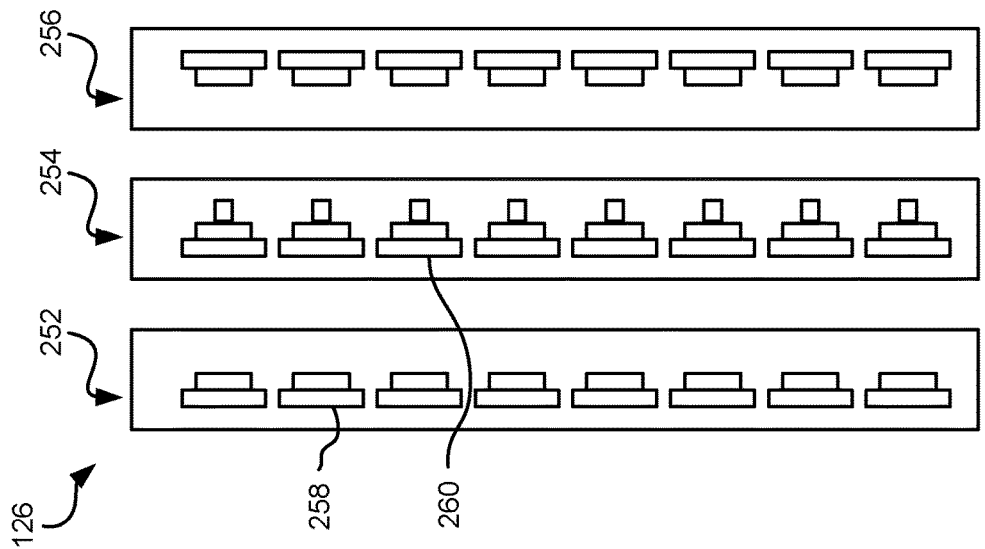
FIG. 4 is a partial tape bearing surface view of a magnetic head having a read-write-read configuration.
Figure 3:
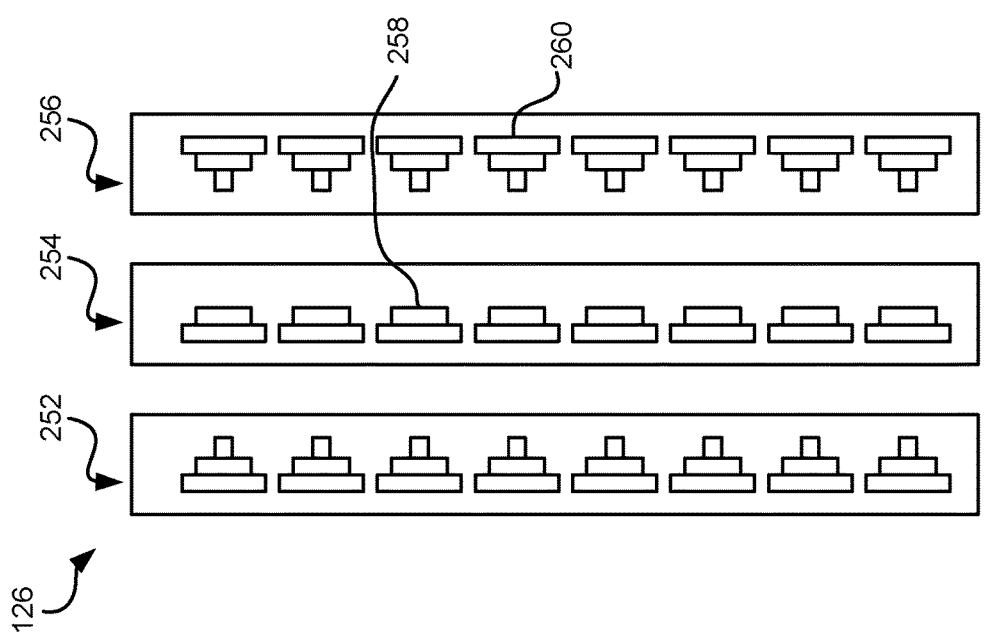
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
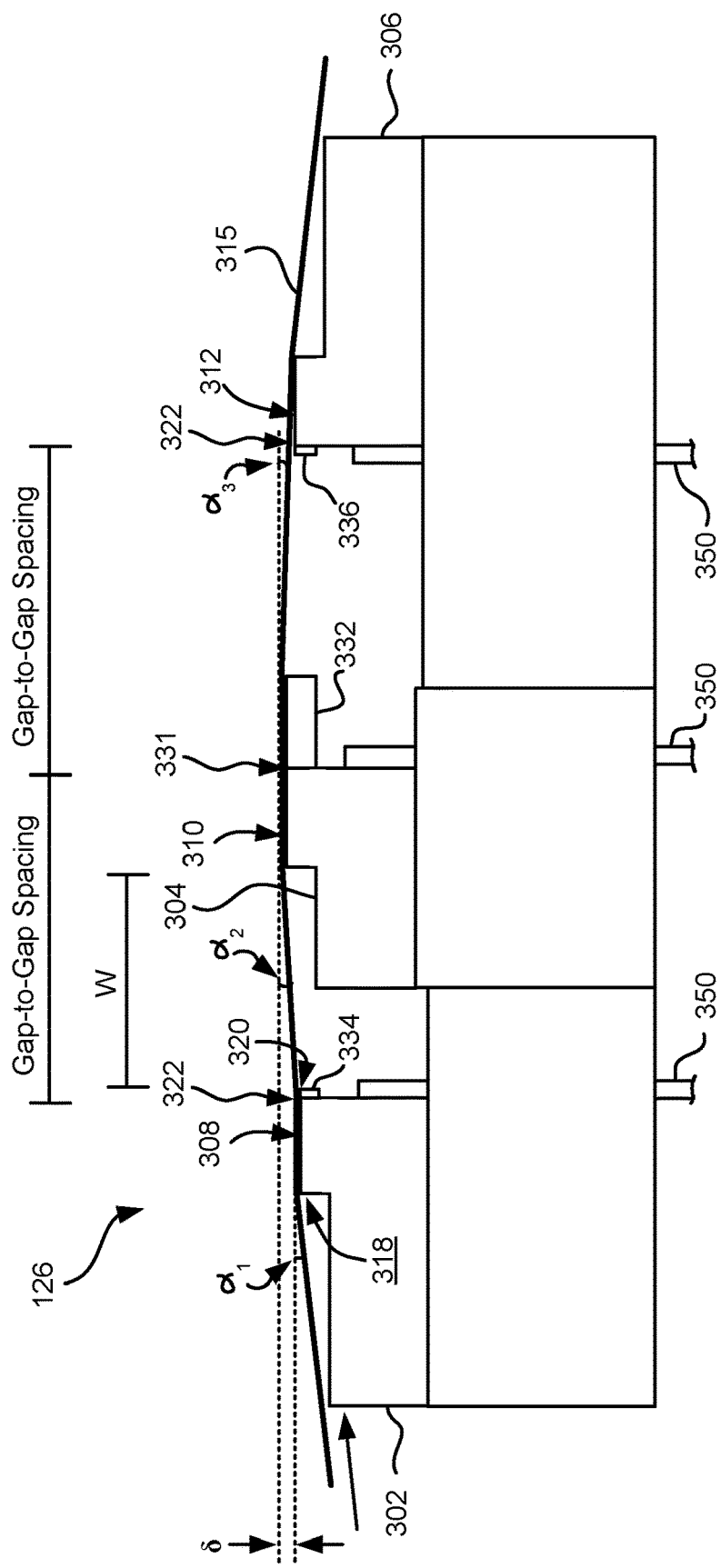
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also, note that the outer modules 302, 306 will alternate as leading modules, depending on the direction of travel of the tape 315.

Figure 6:
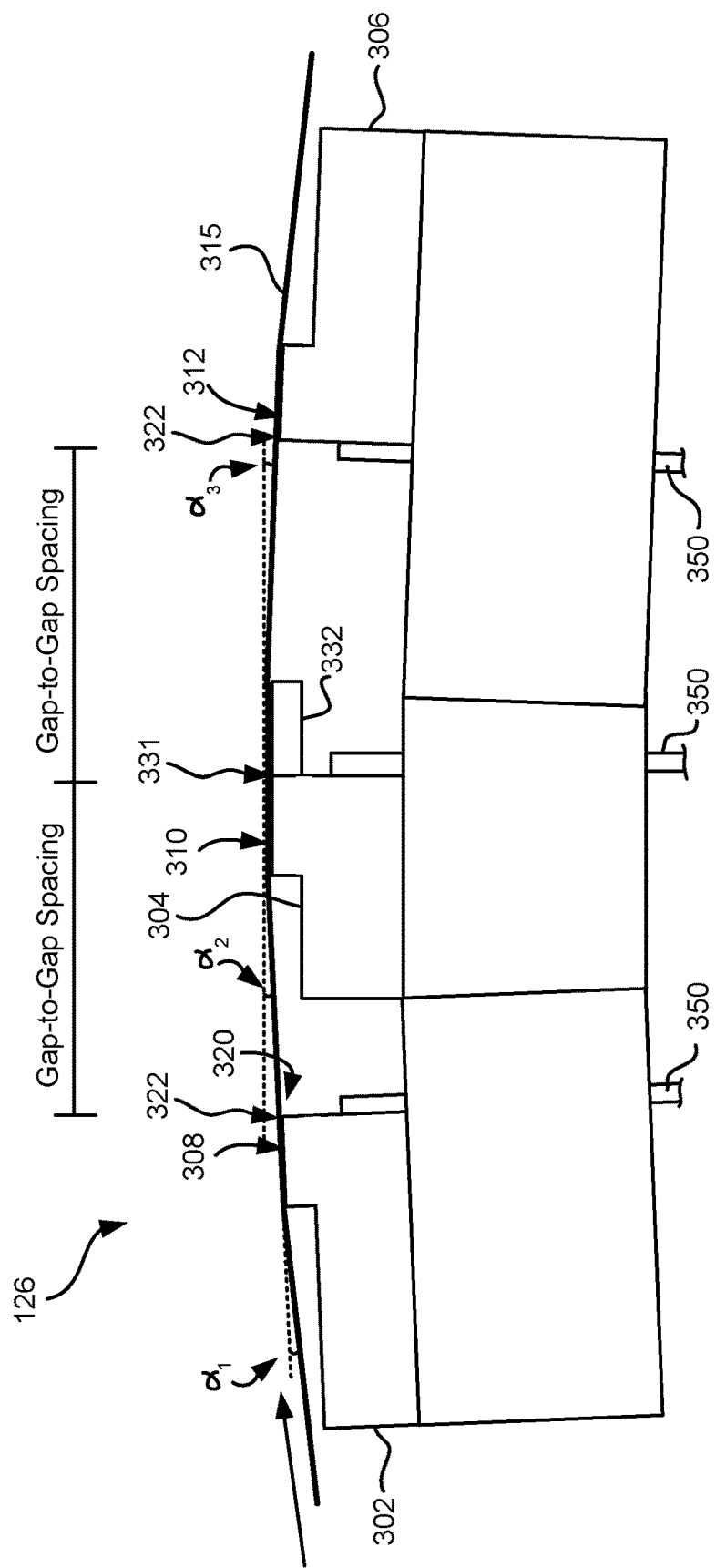
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
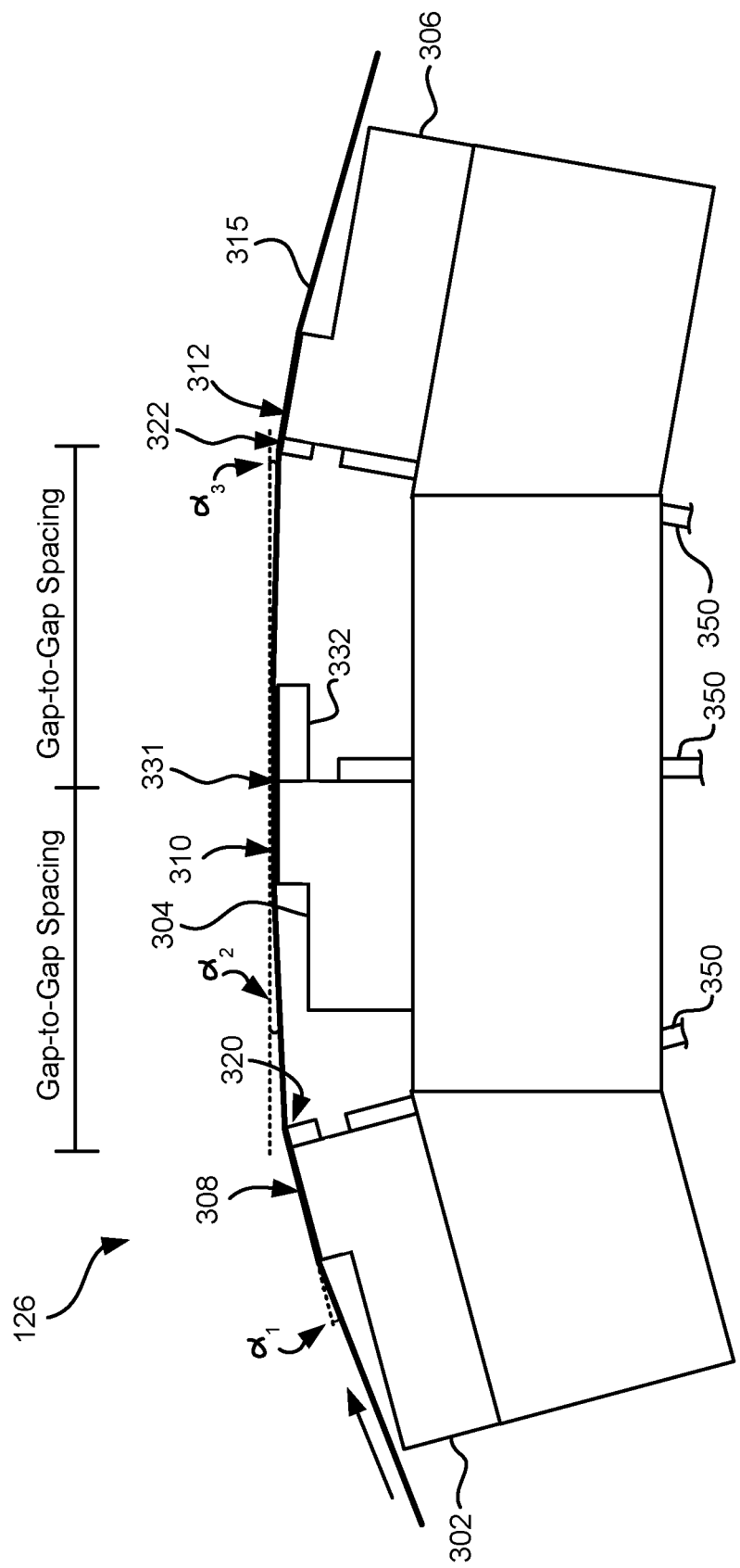
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

As previously mentioned, the quantity of data stored on a magnetic tape may be expanded by increasing the number of data tracks across the tape. More tracks are made possible by reducing feature sizes of the readers and writers, such as by using thin-film fabrication techniques and magnetoresistive (MR) sensors. However, one issue limiting areal density is misregistration caused by tape lateral motion. As tape is being run over the surface of a tape head, lateral shifts in the relative position between the transducers and the data tracks on the tape may occur.

Conventional tape drives include a series of roller bearings which guide the tape over the magnetic head mechanism where data is transferred to and/or from the tape. In such conventional drives, the guiding roller bearings typically have features patterned on them to help reduce the wandering effect of the tape. These rollers may use flanges or grooves to constrain the tape from wandering too far in the lateral direction. However, while conventional implementations of grooved bearing designs have produced some benefits, they have also introduced disturbances in the tape motion, caused by imperfections in the roller guide bearings themselves. The inventors have discovered that such imperfections have a negative effect on the position error signal (PES) by causing bearing harmonics, inner ball pass frequencies, and/or outer ball pass frequencies. While small, these disturbances hinder attempts to further reduce overall PES for tape drive systems that attempt to implement higher data capacity.

In sharp contrast, various embodiments described herein are able to achieve reduced lateral tape motion by implementing one or more patterned bars having recessed regions formed in a tape bearing surface of the patterned bars. The inventors have discovered that the friction between these one or more patterned bars and the tape as it is passed thereover will act to dampen the lateral tape motion, while also eliminating the roller guide bearing disturbances which plague conventional tape drives. Therefore, these reductions to lateral tape motion may be achieved while also using smooth (non-grooved) tape bearing surfaces on the roller guides, as will be described in further detail below.

Looking to FIG. 8 a system 800 is depicted in accordance with one embodiment. As an option, the present system 800 may be implemented in conjunction with features from any other embodiment listed herein, such as those described with reference to the other FIGS., such as FIGS. 1-7. However, such system 800 and others presented herein may be used in various applications and/or in permutations which may or may not be specifically described in the illustrative embodiments listed herein. Further, the system 800 presented herein may be used in any desired environment. Thus FIG. 8 (and the other FIGS.) may be deemed to include any possible permutation.

System 800 is shown as having a magnetic head having a module 808 positioned between a tape supply cartridge 804 and a take-up reel 806. The system 800 also includes guides 810 and a patterned bar 812. Module 808 is coupled to a controller 128 via a cable 130, while controller 128 may further be coupled to a memory 136. Moreover, an actuator 132 may be used to control a position of the module 808 relative to the tape 814.

Module 808 may include read and/or write transducers positioned on a tape bearing surface of the module 808 according to any of the approaches described herein. Thus, according to an exemplary approach, module 808 may include a first array of read transducers sandwiched between a second and third array of write transducers, e.g., to enable bi-directional functionality. Moreover, the transducers may be submerged in the module and positioned towards the tape bearing surface of the module 808 as would be appreciated by one skilled in the art. For example, a wear protection coating may be formed over the transducers.

As described herein, the guides 810 are preferably configured to guide the magnetic tape 814 over the module 808. Accordingly, the guides 810 may be selectively positioned in order to guide the magnetic tape 814 over the module 808 at set wrap angles $\theta_1$, $\theta_2$ measured between the tape 814 and the tape bearing surface of module 808 as shown. According to some approaches, a larger (tighter) wrap angle may be desired. However, in other approaches a smaller (more open) wrap angle may be implemented.

The patterned bar 812 is positioned relative to the adjacent guide 810 and module 808 to engage the magnetic tape 814. In other words, the tape 814 preferably engages a tape bearing surface 816 of the patterned bar 812 as it passes thereover. As illustrated in the present embodiment, a leading edge of the patterned bar 812 may be a skiving edge. Thus, the leading edge of the patterned bar 812 may cause the tape to skive, or scrape away, air as the tape wraps over the leading edge thereof. The leading edge is generally the first edge the tape encounters as it travels over the patterned bar 812. In FIG. 8, when the tape travels left-to-right (from tape supply cartridge 804 towards take-up reel 806), edge 818 of the patterned bar 812 is the leading edge. When the tape travels in the opposite direction (toward tape supply cartridge 804), the leading edge is opposite the edge 818.

While the leading edge may be skiving in preferred embodiments, it should be noted that the leading edge of the patterned bar 812 may have a different shape. For example, the tape 814 may engage the tape bearing surface 816 of the patterned bar 812 without implementing a skiving edge. Accordingly, the patterned bar 812 may be positioned such that a wrap angle of 0° is achieved at one or both of the edges of the tape bearing surface of the patterned bar 812, as will be described in further detail below (e.g., see FIGS. 10B-10D).

With continued reference to FIG. 8, the patterned bar 812 is preferably not directly coupled to the module 808. In other words, the patterned bar 812 is preferably not formed on, adhered directly to, etc. the module 808. Rather, the patterned bar 812 is preferably coupled in the drive such that it does not move with the module 808 when the module is moving, e.g., being moved by one or more actuators during track-following. However, it should be noted that the patterned bar 812 may be indirectly coupled to the module 808 in the sense that both the module 808 and the patterned bar 812 may be coupled to a housing (not shown) of the system, e.g., for structural support.

The patterned bar 812 may be constructed of any other material which would be apparent to one skilled in the art upon reading the present disclosure. In one approach, the patterned bar 812 may include a same material as the module 808. According to one approach, the patterned bar 812 may be made using the same or similar material as wafer materials used to form the module 808. According to one example, the patterned bar 812 and/or the module 808 may include AlTiC. In other examples, the patterned bar 812 may be formed of a metal, e.g., iron; a ceramic; etc.

The tape bearing surface of the patterned bar 812 includes a plurality of recessed regions therealong. The recessed regions are preferably configured to create a vacuum therein when a magnetic tape is passed across the tape bearing surface of the patterned bar 812. Accordingly, the recessed regions may be able to reduce the lateral tape motion of the tape during motion by implementing a low pressure suction effect on the tape as will be described in further detail below.

Referring momentarily to FIGS. 9A-9F, the tape bearing surface of different patterned bars 900, 930, 950 are depicted in accordance with several embodiments. As an option, the present patterned bars 900, 930, 950 may be implemented in conjunction with features from any other embodiment listed herein, such as those described with reference to the other FIGS., such as FIG. 8. However, such patterned bars 900, 930, 950 and others presented herein may be used in various applications and/or in permutations which may or may not be specifically described in the illustrative embodiments listed herein. Further, the patterned bars 900, 930, 950 presented herein may be used in any desired environment. Thus FIGS. 9A-9F (and the other FIGS.) may be deemed to include any possible permutation. It should also be noted that the relative dimensions of the present embodiments are presented by way of example, and are in no way intended to limit the invention.

Figure 9A:
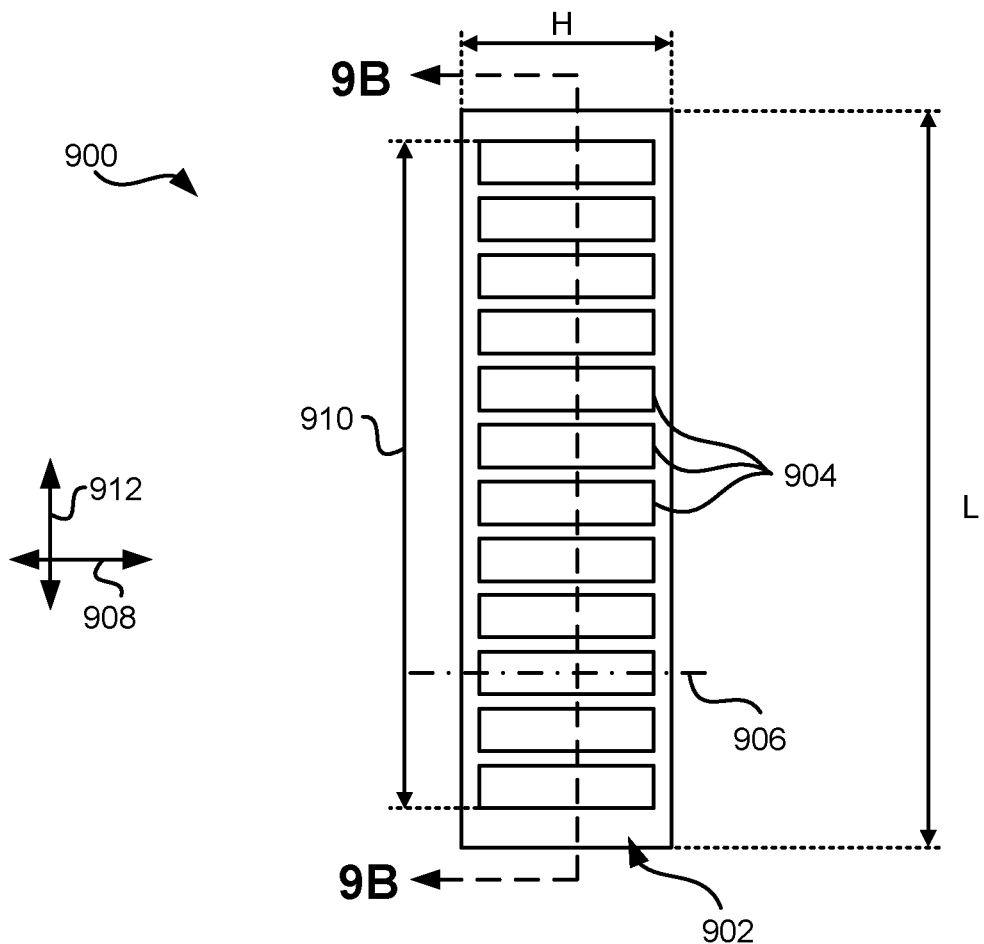
FIG. 9A is a partial top-down view of a tape bearing side of a patterned bar according to one embodiment.
Figure 9B:
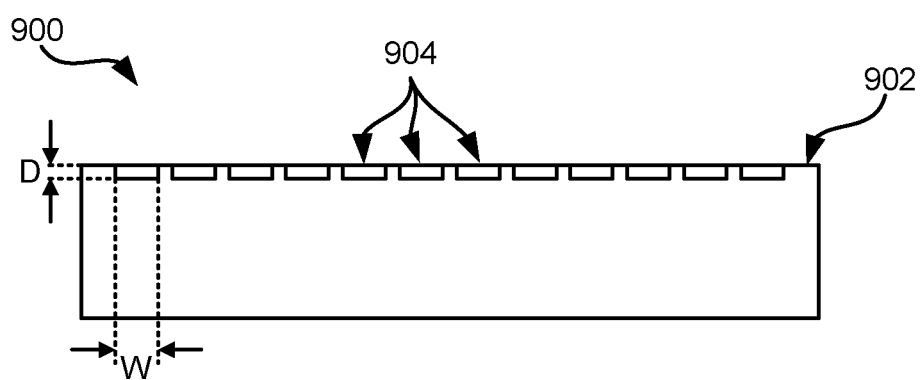
FIG. 9B is a partial cross-sectional view of the patterned bar in FIG. 9A.
Figure 9C:
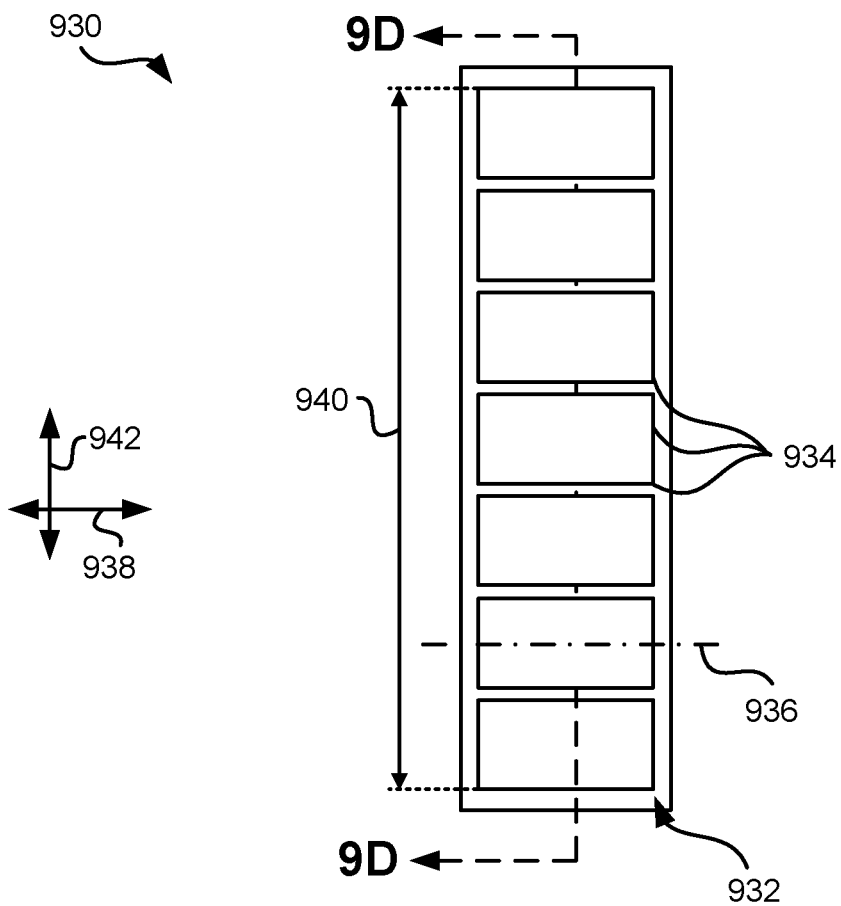
FIG. 9C is a partial top-down view of a tape bearing side of a patterned bar according to one embodiment.

Looking to FIGS. 9A-9B, the tape bearing surface 902 of a patterned bar 900 is shown as including recessed regions 904 according to one approach. Here, the recessed regions 904 are formed such that a longitudinal axis 906 of each of the recessed regions 904 is about parallel to an intended tape travel path 908. The width W of each of the recessed regions may be at least about 140 μm, but could be higher or lower depending on the desired approach. Moreover, a distance 910 between outer ends of the outermost recessed regions, measured along a direction 912 perpendicular to an intended tape travel path 908, may be at least 50%, more preferably at least 75% of a width of a magnetic tape being passed thereover, but could be higher or lower depending on the desired embodiment. An exemplary length L of the overall patterned bar 900 along the cross-track direction 912 may be from about 20 mm to about 30 mm, but could be higher or lower depending on the desired embodiment. An exemplary height H of the of the overall patterned bar 900 along the intended tape travel path 908 may be from about 0.5 mm to about 3 mm, but could be higher or lower depending on the desired embodiment.

Looking to FIG. 9B, each of the recessed regions 904 are recessed from the tape bearing surface 902 of the patterned bar 900 by a depth D which is preferably at least about 1.5 μm, more preferably at least about 2 μm, but could be higher or lower depending on the desired embodiment. The depth at which the recessed regions 904 are recessed to may depend on the thickness, target operating speed, width, etc., of the magnetic tape being passed thereover and/or the other dimensions, spacing, number, etc., of the recessed regions 904 along the patterned bar 900 itself. As mentioned above, the recessed regions 904 are preferably configured to create a vacuum (e.g., low pressure region) therein when a magnetic tape is passed across the tape bearing surface 902 of the patterned bar 900. However, it should be noted that in order to form the low pressure region, the boundary of the recessed regions 904 are preferably enclosed, e.g., such that the recessed regions 904 do not extend to the edges of the patterned bar 900. Accordingly, an upper periphery of each of the recessed regions 904 in the present embodiment lie along a common plane which forms the tape bearing surface 902. Thus, as tape is passed over the tape bearing surface 902 of the patterned bar 900, a subambient pressure is formed in each of the recessed regions 904 and maintained therein by the relative movement between the tape and the tape bearing surface 902 formed by the upper periphery of each of the recessed regions 904. As a result, environmental air pressure urges the tape toward the recessed regions 904. Moreover, the longitudinal edges of the recessed regions 904 provide little frictional resistance unless the tape attempts to move in the cross-track direction 912, e.g., as a result of a lateral tape motion event, whereby the recessed regions 904 tend to prevent the tape from moving laterally as such.

Moreover, the depth D of the recessed regions 904 may be adjusted depending on the pressure differential desired. According to an example, which is in no way intended to limit the invention, shallower recessed regions may be implemented for use with a thinner magnetic tape that has a relatively slow operating (fly) speed in comparison to deeper recessed regions which may be implemented for use with a relatively thicker magnetic tape that has a faster operating (fly) speed. The deeper recessed regions may provide a lower subambient pressure to compensate for the thicker tape and faster operating speed, while the shallower recessed regions provide a higher subambient pressure for use with the thinner and/or slower moving tape. Accordingly, the recessed regions are preferably configured such that they are able to reduce the lateral tape motion of the tape during motion by causing the aforementioned subambient pressure as would be appreciated by one with ordinary skill in the art upon reading the present description.

Again, the size, orientation, shape, etc. of the recessed regions may vary depending on the desired embodiment. Looking now to FIG. 9C-9D, a patterned bar 930 according to another embodiment is shown. Here, the tape bearing surface 932 of the patterned bar 930 is shown as including recessed regions 934 configured according to a different approach. The longitudinal axis 936 of each of the recessed regions 934 is also about parallel to an intended tape travel path 938. However, the width W of each of the recessed regions may be at least about 560 µm, but could be higher or lower depending on the desired approach. Also, the distance 940 between outer ends of the outermost recessed regions along a direction 942 perpendicular to an intended tape travel path 938 may be at least 50%, more preferably at least 75% of a width of a magnetic tape being passed thereover, but could be higher or lower depending on the desired embodiment.

Figure 9D:
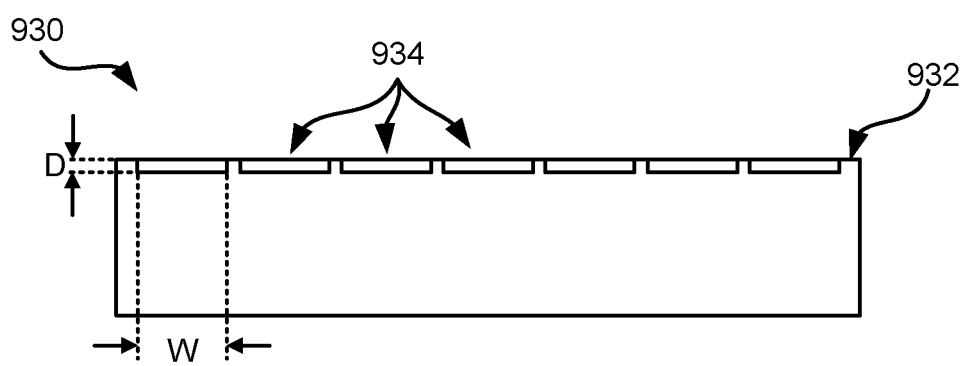
FIG. 9D is a partial cross-sectional view of the patterned bar in FIG. 9C.

Looking to FIG. 9D, each of the recessed regions 934 is recessed from the tape bearing surface 932 of the patterned bar 930 by a depth D which is preferably at least about 1.5 µm, more preferably at least about 2 µm, but could be higher or lower depending on the desired embodiment. As described above, the depth at which the recessed regions 934 are recessed to may depend on the thickness, design operating speed, width, etc., of the magnetic tape being passed thereover and/or the other dimensions, spacing, number, etc., of the recessed regions 934 along the patterned bar 930 itself.

Figure 9E:
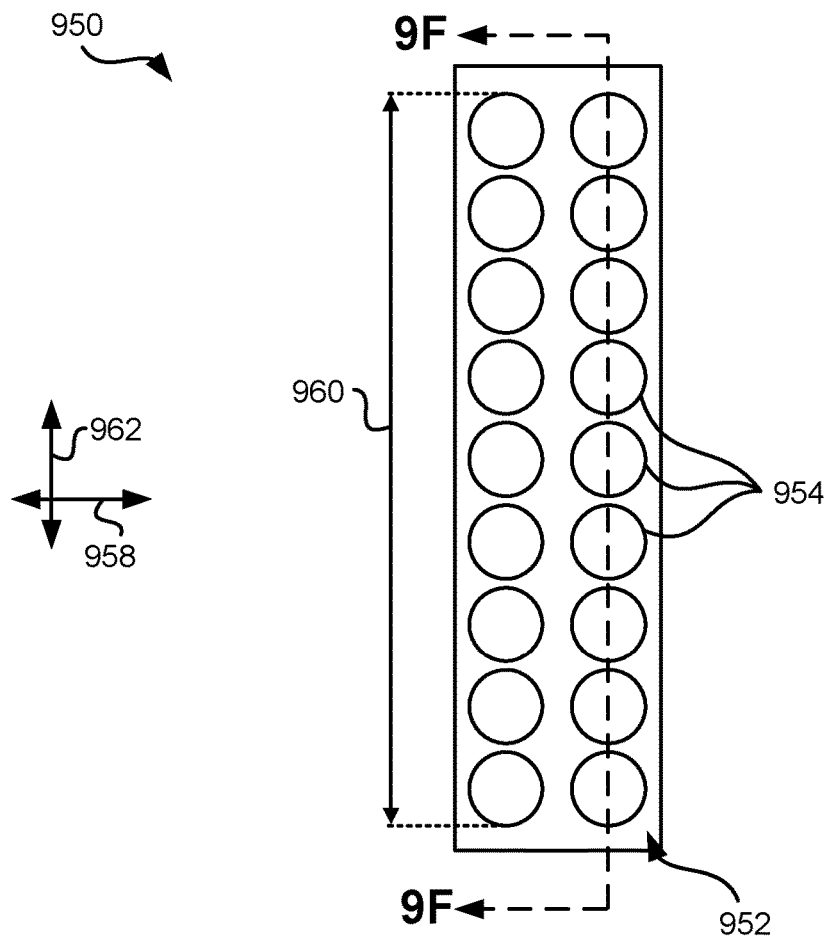
FIG. 9E is a partial top-down view of a tape bearing side of a patterned bar according to one embodiment.
Figure 9F:
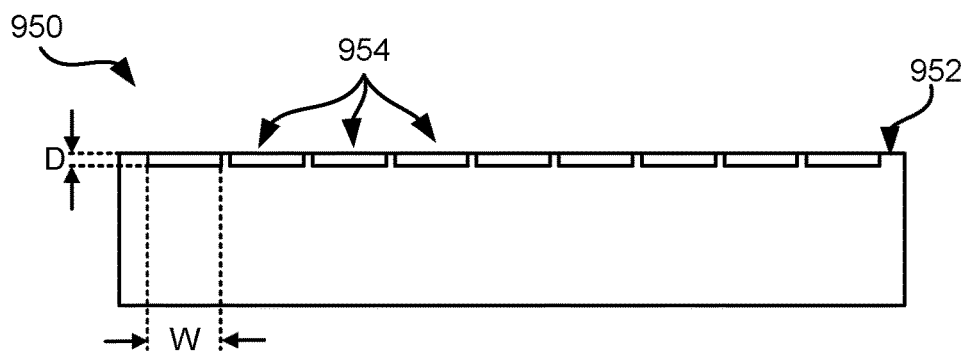
FIG. 9F is a partial cross-sectional view of the patterned bar in FIG. 9E.

FIGS. 9E-9F depict a patterned bar 950 according to yet another embodiment. Here, the tape bearing surface 952 of the patterned bar 950 is shown as including recessed regions 954 according to a different approach. Here, each of the recessed regions 954 has a circular shape as seen in the top-down view of the patterned bar 950 in FIG. 9E. However, in other embodiments, some or all of the recessed regions may have any type of shape, e.g., a trapezoidal shape, a pentagonal shape, a hexagonal shape, a heptagonal shape, a square shape, an oval shape, etc. and combinations thereof.

The distance 960 between outer ends of the outermost recessed regions along a direction 962 perpendicular to an intended tape travel path 958 may be at least 50%, more preferably at least 75% of a width of a magnetic tape being passed thereover, but could be higher or lower depending on the desired embodiment. Moreover, each of the recessed regions 954 are recessed from the tape bearing surface 952 of the patterned bar 950 by a depth D which is preferably at least about 1.5 µm, more preferably at least about 2 µm, but could be higher or lower depending on the desired embodiment.

According to some approaches, the patterned bars may be formed by etching (e.g., such as chemical etching) out the plurality of recessed regions from a surface of the patterned bar while maintaining the upper periphery of each of the recessed regions such that they lie along a common plane using a process which would be apparent to one skilled in the art upon reading the present description. However, in other approaches the plurality of recessed regions may be formed all the way across a surface of a center bar component (e.g., by cutting grooves into the center bar using a diamond blade, laser scribing, etc.) after which closures may be coupled to (e.g., using an adhesive, fasteners, etc.) the opposite sides of the center bar component, thereby forming the plurality of recessed regions while also maintaining an upper periphery of each of the recessed regions which lie along a common plane.

Referring back to FIG. 8, by implementing one or more patterned bars 812, the system 800 may be able to successfully prevent lateral tape motion during use. Moreover, this improvement may be achieved in the absence of any other conventional attempts to overcome lateral tape motion previously mentioned. It follows that a tape bearing surface (e.g., outer periphery) of the guides 810 need not be textured, even when the guides 810 are roller guides. In other words, the tape bearing surface of the guides 810 are preferably smooth. Moreover, the guides 810 may be non-rotatable (rotatably fixed) in some approaches, while in others, the guides may be able to rotate. Thus, in addition to preventing lateral tape motion, system 800 may also be able to prevent the roller disturbances experienced in conventional products. Removing the texturing (e.g., groove features) from the tape bearing surfaces of roller guides eliminates the roller guide bearing noise contribution to the PES undesirably experienced in conventional products, because the tape will 'fly' at a small height just above the tape bearing surface of the roller guides. As a result, the smooth roller guides will not rotate, or will rotate very slowly even when free to rotate, and will therefore not contribute to the PES of the system.

Moreover, by implementing one or more patterned bars 812, the system 800 may be able to successfully prevent lateral tape motion during use when flangeless rollers are used. Ideally, the rollers used in a system according to one embodiment are flangeless and smooth.

As previously mentioned, a leading edge of the patterned bar 812, and preferably each tape-engaging edge of the patterned bar 812, may be a skiving edge. Thus, the leading edge of the patterned bar 812 may skive, or scrape off, air from below the tape as the tape wraps over the leading edge 818 thereof. Moreover, as the tape 814 reaches the leading edge of the recessed regions, the aforementioned air pressure differential may cause the tape 814 to sink into the recesses (e.g., pockets) thereof while the tape 814 is traveling in the intended tape travel path 820. Accordingly, as the tape runs along the intended tape travel path 820, the longitudinal edges of the pocket feature tend to stabilize the tape, thereby minimizing occurrence of lateral tape motion events. A stabilizing effect exists for each pocket, and the sum of all the pockets over the length of the bar adds to the damping effect, which is measurable. The design of the pocket feature and bar geometry can be optimized for operation in a tape drive.

In other embodiments, the leading edge(s) of the patterned bar 812 do not skive air from the tape while the tape 814 is traveling thereover. Thus, the leading edge of the patterned bar 812 may not be a skiving edge in some embodiments.

Referring now to FIGS. 10A-10D, systems 1000, 1010, 1020, 1030 having a patterned bar 1002 positioned in different orientations relative to a magnetic tape are depicted in accordance with several embodiments. As an option, the present systems 1000, 1010, 1020, 1030 may be implemented in conjunction with features from any other embodiment listed herein, such as those described with reference to the other FIGS., such as FIG. 8. However, such systems 1000, 1010, 1020, 1030 and others presented herein may be used in various applications and/or in permutations which may or may not be specifically described in the illustrative embodiments listed herein. Further, the systems 1000, 1010, 1020, 1030 presented herein may be used in any desired environment. Thus FIGS. 10A-10D (and the other FIGS.) may be deemed to include any possible permutation. It should also be noted that the relative dimensions of the present embodiments are presented by way of example, and are in no way intended to limit the invention.

Figure 10A:
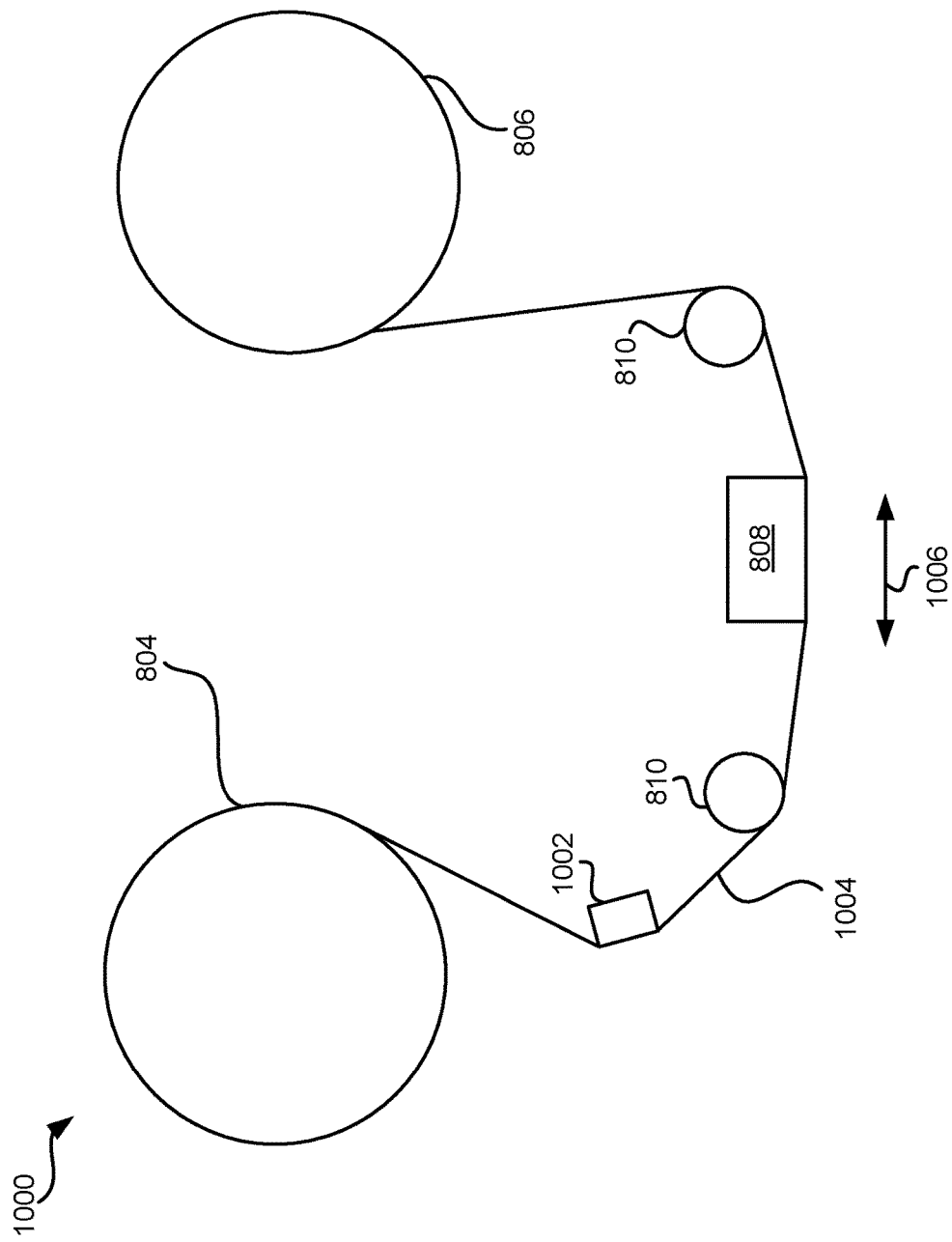
FIG. 10A is a schematic diagram of a system having a patterned bar positioned in a configuration according to one embodiment.

Looking first to system 1000 of FIG. 10A, patterned bar 1002 is positioned between tape supply cartridge 804 and guide 810 while take-up reel 806 is on the opposite side of module 808 along the intended taper travel path 1006. Both edges of the patterned bar 1002 which engage the tape 1004 are skiving edges.

Figure 10B:
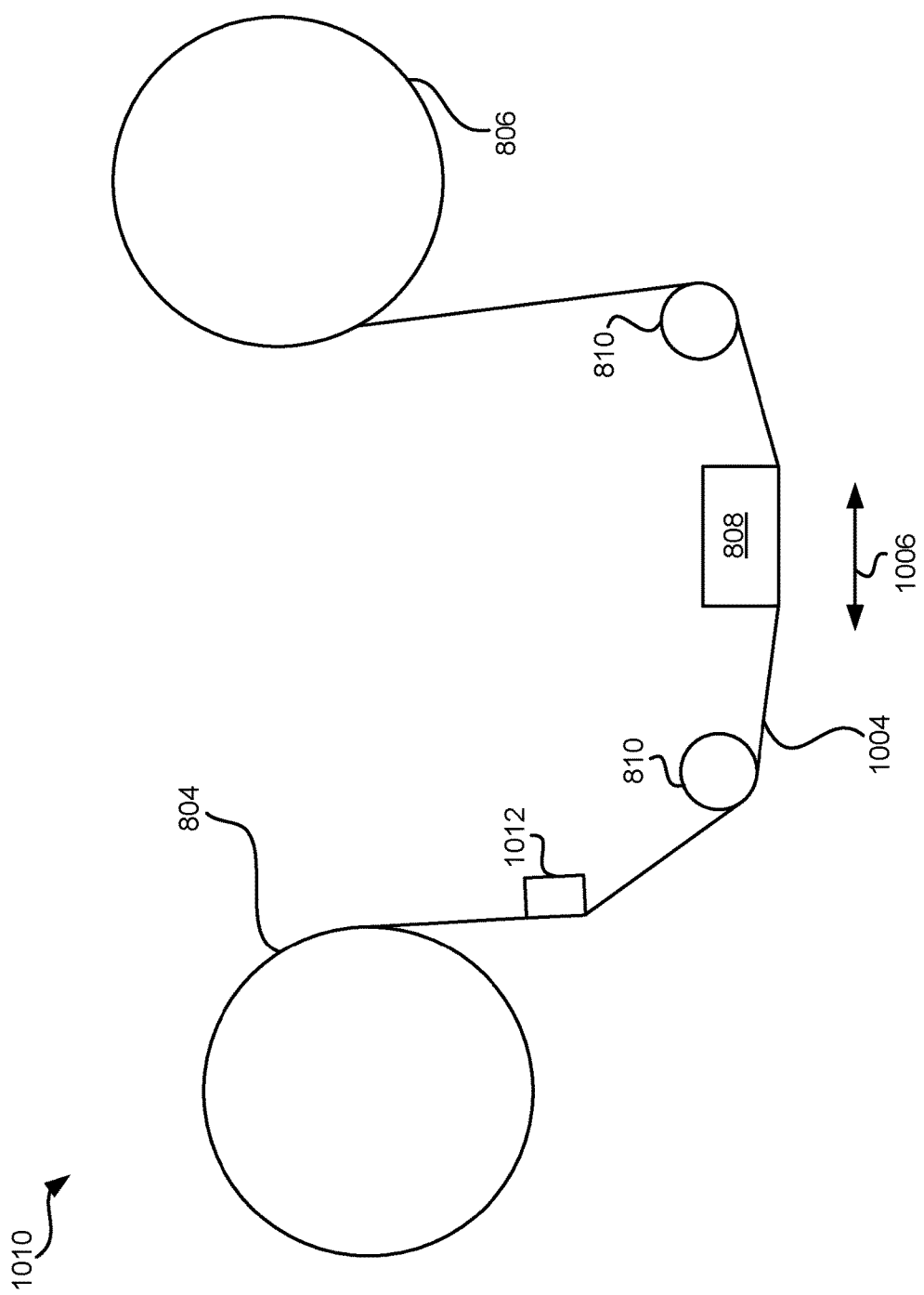
FIG. 10B is a schematic diagram of a system having a patterned bar positioned in a configuration according to one embodiment.

However, looking to systems 1010 and 1020 of FIGS. 10B-10C respectively, each of the corresponding patterned bars 1012, 1022 have one skiving edge and one non-skiving edge, where the non-skiving edge may have a wrap angle of 0°, may be curved so as not to skive air, etc. The orientations of the patterned bars 1012, 1022 are effectively mirror images of each other for the two tape travel directions thereover, but in other embodiments, either of the patterned bars 1012, 1022 may have a different orientation and/or position along the intended tape travel path 1006 (e.g., see FIG. 11 below).

Figure 10D:
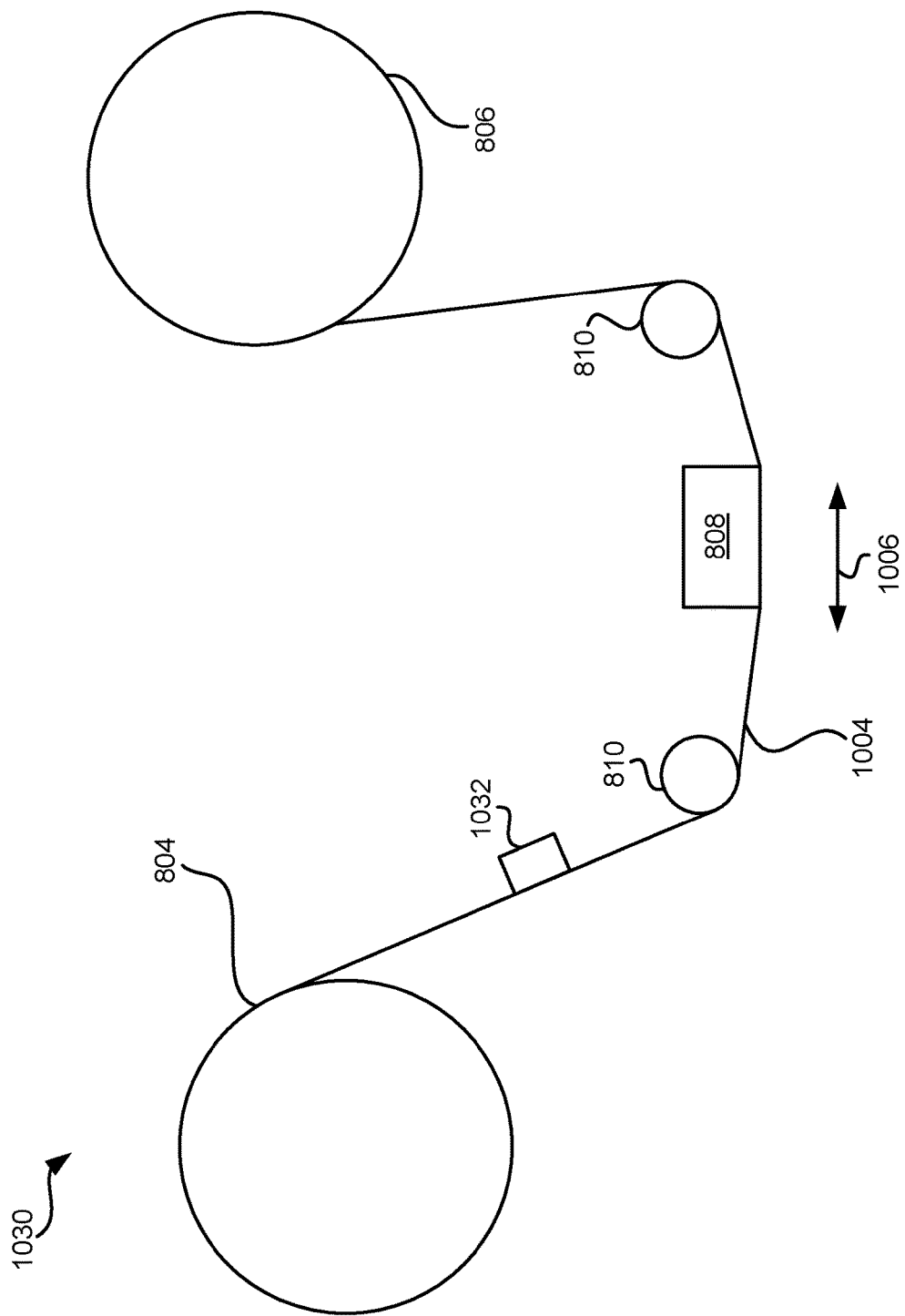
FIG. 10D is a schematic diagram of a system having a patterned bar positioned in a configuration according to one embodiment.

Furthermore, system 1030 of FIG. 10D includes a patterned bar 1032, where both edges of the patterned bar 1032 that engage the tape 1004 are non-skiving edges. In one approach, the patterned bar 1032 is positioned such that the tape 1004 has a wrap angle of 0° at both tape engaging edges of the patterned bar 1032. In another approach, the edges may be curved such that air is not skived even with a positive wrap angle.

FIG. 11 depicts a system 1100 in accordance with one embodiment. As an option, the present system 1100 may be implemented in conjunction with features from any other embodiment listed herein, such as those described with reference to the other FIGS., such as FIG. 8. Specifically, FIG. 11 illustrates variations of the embodiment of FIG. 8 depicting several exemplary configurations within a system 1100. Accordingly, various components of FIG. 11 have common numbering with those of FIG. 8.

However, such system 1100 and others presented herein may be used in various applications and/or in permutations which may or may not be specifically described in the illustrative embodiments listed herein. Further, the system 1100 presented herein may be used in any desired environment. Thus FIG. 11 (and the other FIGS.) may be deemed to include any possible permutation.

System 1100 is shown as having a magnetic head module 808 positioned between a tape supply cartridge 804 and a take-up reel 806. The system 1100 also includes guides 810 and patterned bars 1112 on either side of the module 808. Module 808 is coupled to a controller 128 via a cable 130, while controller 128 may further be coupled to a memory 136. Moreover, an actuator 132 may be used to control a position of the module 808 relative to the tape 814. Module 808 may also include read and/or write transducers positioned on a tape bearing surface of the module 808 according to any of the approaches described herein.

In the present embodiment, the patterned bars 1112 are positioned (e.g., configured) to guide the magnetic tape 814 over the module 808 and set wrap angles $\theta_3$, $\theta_4$ of the magnetic tape 814 relative to either side of the module 808. Accordingly, each patterned bar 1112 is positioned between the module 808 and a respective one of the guides 810. As previously mentioned, in some approaches a larger (tighter) wrap angle may be desired, e.g., to prevent the tape 814 from tenting up and over the transducers on the module 808. However, in other approaches a smaller (more open) wrap angle may be implemented.

The patterned bars 1112 are positioned relative to the respective adjacent guides 810 and module 808 such that the patterned bars 1112 engage the magnetic tape 814. In other words, the tape 814 preferably engages a tape bearing surface 1116 of each of the patterned bars 1112 as it is passed thereover. As illustrated in the present embodiment, both edges of each of the patterned bars 1112 are skiving edges. Thus, the leading edges of the patterned bars 1112 may cause the tape to skive, or scrape off, air from the tape as the tape wraps over the leading edge thereof, regardless of the intended tape travel path. However, in other approaches, any one or more of the edges of either of the patterned bars 1112 may not be a skiving edge (e.g., have a wrap angle of 0°, have a curved edge, etc.), e.g., see FIGS. 10B-10D above.

Referring still to FIG. 11, the patterned bars 1112 may each have a plurality of recessed regions along a tape bearing surface thereof according to any of the approaches described herein. Accordingly, each of the plurality of recessed regions along the tape bearing surface of each of the patterned bars 1112 are preferably configured to create a subambient pressure condition therein when a magnetic tape is passed across the tape bearing surface of the patterned bars 1112.

Figure 12:
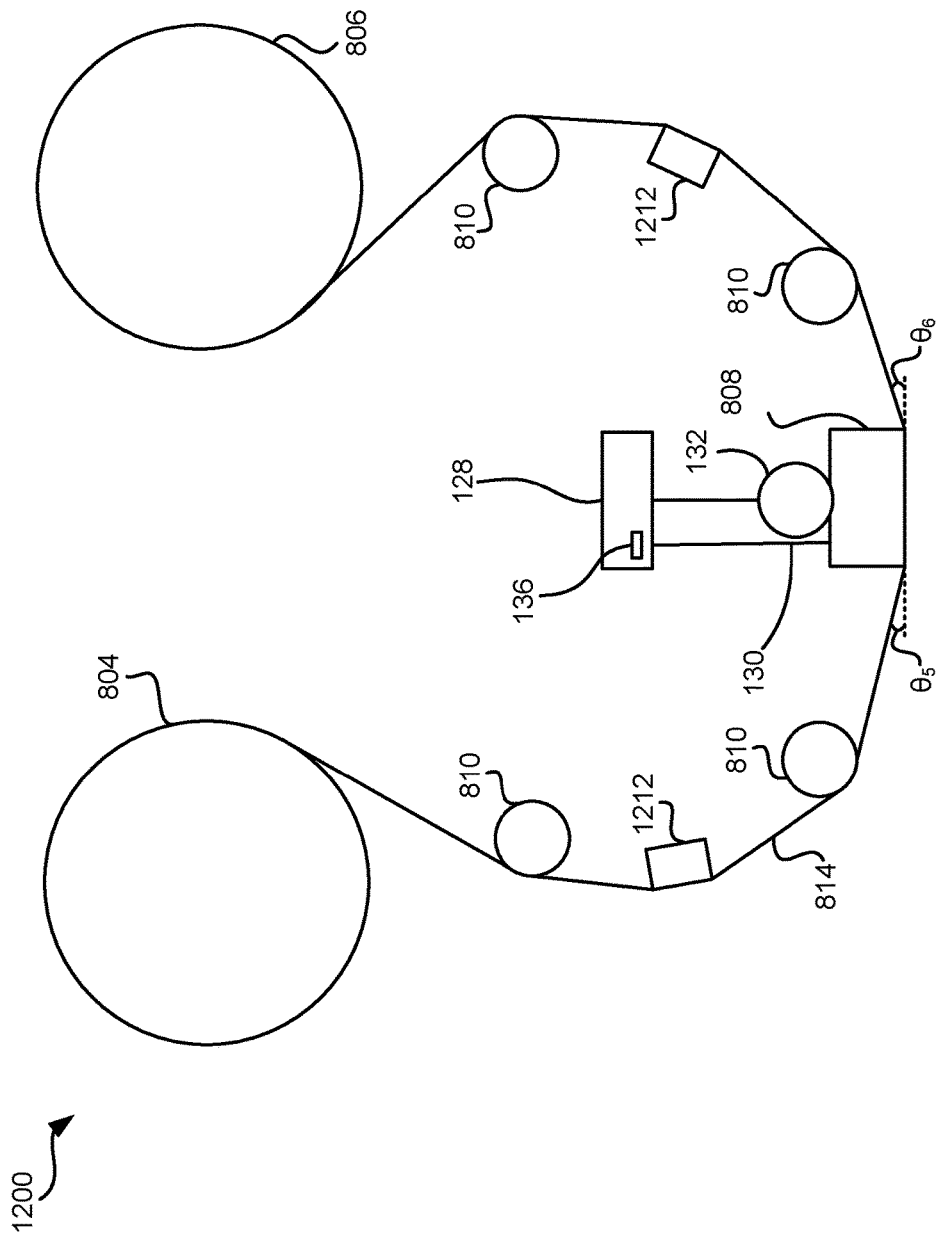
FIG. 12 is a schematic diagram of a system according to one embodiment.

Further still, FIG. 12 illustrates a system 1200 having patterned bars in accordance with another embodiment. As an option, the present system 1200 may be implemented in conjunction with features from any other embodiment listed herein, such as those described with reference to the other FIGS., such as FIG. 8. Specifically, FIG. 12 illustrates variations of the embodiment of FIG. 8 depicting several exemplary configurations within a system 1200. Accordingly, various components of FIG. 12 have common numbering with those of FIG. 8.

However, such system 1200 and others presented herein may be used in various applications and/or in permutations which may or may not be specifically described in the illustrative embodiments listed herein. Further, the system 1200 presented herein may be used in any desired environment. Thus FIG. 12 (and the other FIGS.) may be deemed to include any possible permutation.

Looking to FIG. 12, system 1200 includes a magnetic tape head module 808 positioned between a tape supply cartridge 804 and a take-up reel 806. The system 1200 also includes guides 810 and patterned bars 1212 on either side of the module 808. Module 808 is coupled to a controller 128 via a cable 130, while controller 128 may further be coupled to a memory 136. Moreover, an actuator 132 may be used to control a position of the module 808 relative to the tape 814. Module 808 may also include read and/or write transducers positioned on a tape bearing surface of the module 808 according to any of the approaches described herein.

In the present embodiment, the patterned bars 1212 are positioned between pairs of the guides 810 on either side of the module 808 as shown. Specifically, one of the patterned bars 1212 is positioned between a first pair of the guides 810 positioned on a right side (a first side) of the module 808 along the intended tape travel path 820, while another one of the patterned bars 1212 is positioned between a second pair of guides 810 positioned on the left side (a second side) of the module 808 opposite the right side along the intended tape travel path 820.

Thus, the guides 810 are positioned (e.g., configured) to guide the magnetic tape 814 over the module 808 and set wrap angles $\theta_5$, $\theta_6$ of the magnetic tape 814 relative to either side of the module 808. Again, as previously mentioned, in some approaches a larger (tighter) wrap angle may be desired, e.g., to prevent the tape 814 from tenting up and over the transducers on the module 808. However, in other approaches a smaller (more open) wrap angle may be implemented.

Furthermore, each of the two patterned bars 1212 in the present embodiment preferably have a plurality of recessed regions along respective tape bearing surfaces thereof, e.g., according to any of the approaches described herein.

Table 1 below presents the results of experiments conducted by the inventors which illustrate the effectiveness of patterned bars according to different illustrative embodiments, which are in no way intended to limit the invention. For the experiment, a tape drive system was converted such that smooth roller guides were used, and a sample patterned bar was introduced into the tape path between pairs of the roller guides, e.g., as shown in FIG. 12. Data was collected over a short region of tape as it traveled across the transducers on the module in a first direction. Moreover, the same region of tape was used to collect the data for each of the results presented in Table 1. Multiple runs of tape were conducted for each of the types of patterned bars, including a baseline just prior to capturing the data for each patterned bar type. Furthermore, the same time frame was used to capture all of the runs (approximately 5 seconds).

TABLE 1

| Width of Each Recessed Region in Patterned Bar | PES Reduction % |
| --- | --- |
| 0 µm (no recessed regions) | 20.97 |
| 140 µm | 26.86 |
| 560 µm | 48.50 |

As shown, the recessed regions having the largest surface area geometry of 560 µm slot widths provided the greatest reduction in PES, while the patterned bar without any recessed regions provided the least reduction in PES. Thus, although patterned bars described herein preferably include a plurality of recessed regions, in some approaches, a bar without any recessed regions may also be present such that it engages a tape along its path to further reduce the effects of lateral tape motion.

It should be noted that lateral tape motion may be detected using timing based servo tracks. Such servo tracks may provide information to the drive regarding the cross track (lateral) position of the head relative to a data band flanked by the servo tracks during reading and/or writing operations. In various approaches, the servo tracks may include additional information, such as information that allows the drive to determine the speed of the tape, longitudinal positioning along the tape, etc., as would be appreciated by one skilled in the art upon reading the present description.

It follows that various embodiments described and/or suggested herein may be able to reduce the lateral tape motion in a tape path while also maintaining smooth (non-grooved) rollers or guides along the tape path. By implementing patterned bars, with recessed regions formed in a tape bearing surface of the patterned bars, a damping effect of lateral tape motion experienced at the magnetic head is achieved. This reduction in lateral tape motion may be achieved by creating a subambient condition (e.g., low pressure region) in the recessed regions when a magnetic tape is passed across the tape bearing surface of the patterned bars, and maintained therein by the relative movement between the tape and the tape bearing surface formed by the upper periphery of each of the recessed regions. Moreover, the longitudinal edges of the recessed regions provide little resistance in the absence of attempts by the tape to move laterally the cross-track direction, e.g., as a result of a lateral tape motion event. However, the recessed regions also tend to prevent the tape from moving laterally as such. Furthermore, use of smooth roller guides along the tape path reduces the grooved roller bearing harmonics experienced in conventional products.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a module having transducers positioned along a tape bearing surface of the module;
a first roller guide; and
a first patterned bar positioned relative to the first roller guide and module to engage a magnetic tape,
wherein the first patterned bar has a plurality of recessed regions along a tape bearing surface thereof,
wherein the first patterned bar is not directly coupled to the module,
wherein both edges of the first patterned bar which engage the magnetic tape are skiving edges,
wherein a longitudinal axis of each of the recessed regions is about parallel to an intended tape travel path.

2. The system as recited in claim 1, comprising:
a second roller guide; and
a second patterned bar positioned relative to the second roller guide and module to engage the magnetic tape,
wherein the second patterned bar has a plurality of recessed regions along a tape bearing surface thereof,
wherein the second patterned bar is not directly coupled to the module,
wherein both edges of the second patterned bar which engage the magnetic tape are skiving edges,
wherein the first patterned bar and the second patterned bar are each positioned to guide the magnetic tape over the module and set a respective wrap angle of the magnetic tape relative to the module.

3. The system as recited in claim 2, with a proviso that a tape bearing surface of the first roller guide is not textured.

4. The system as recited in claim 2, wherein the first patterned bar is positioned between the first roller guide and the module, wherein a separation exists between the first roller guide and the first patterned bar, wherein a separation exists between the first patterned bar and the module, wherein the second patterned bar is positioned between the second roller guide and the module, wherein a separation exists between the second roller guide and the second patterned bar, wherein a separation exists between the second patterned bar and the module.

5. The system as recited in claim 1, wherein a distance between outer ends of outermost recessed regions along a direction perpendicular to an intended tape travel path is at least 75% of a width of the magnetic tape.

6. The system as recited in claim 1, wherein the first patterned bar does not move with the module, wherein each of the recessed regions is recessed from the tape bearing surface of the first patterned bar by at least about 1.5 μm.

7. The system as recited in claim 1, wherein an upper periphery of each of the recessed regions lies along a common plane.

8. The system as recited in claim 1, wherein each of the plurality of recessed regions is configured to create a vacuum therein when the magnetic tape is passed across the tape bearing surface of the first patterned bar.

9. The system as recited in claim 1, comprising:
a drive mechanism for passing the magnetic tape over the module; and
a controller electrically coupled to the module.

10. A system, comprising:
a module having transducers positioned along a tape bearing surface of the module;
a first pair of guides positioned on a first side of the module along an intended tape travel path;
a first patterned bar positioned between the first pair of guides;
a second pair of guides positioned on a second side of the module opposite the first side along the intended tape travel path;
a second patterned bar positioned between the second pair of guides; and
a controller electrically coupled to the module,
wherein the first and second patterned bars each have a plurality of recessed regions along tape bearing surfaces thereof.

11. The system as recited in claim 10, with a proviso that a tape bearing surface of each of the guides is not textured.

12. The system as recited in claim 10, further comprising:
a drive mechanism for passing a magnetic tape over the modules.

13. The system as recited in claim 10, wherein the first and second patterned bars each include a same material as the module, wherein, for each of the first and second patterned bars, each of the recessed regions are recessed by at least about 1.5 μm from the respective tape bearing surface.

14. The system as recited in claim 10, wherein, for each of the first and second patterned bars, a distance between outer ends of outermost recessed regions along a direction perpendicular to the intended tape travel path is at least 75% of a width of a magnetic tape.

15. The system as recited in claim 10, wherein, for each of the first and second patterned bars, a longitudinal axis of each of the recessed regions is about parallel to the intended tape travel path.

16. The system as recited in claim 10, wherein, for each of the first and second patterned bars, an upper periphery of each of the recessed regions lies along a respective common plane.

17. The system as recited in claim 10, wherein, for each of the first and second patterned bars, each of the plurality of recessed regions are configured to create a vacuum therein when a magnetic tape is passed across the respective tape bearing surface.

18. The system as recited in claim 10, wherein both edges of each of the first and second patterned bars which engage a magnetic tape are skiving edges.

* * * * *